United States Patent [19]

Ishihara et al.

[11] Patent Number: 5,537,235
[45] Date of Patent: Jul. 16, 1996

[54] LIQUID CRYSTAL DISPLAY WITH CURVED SUBSTRATE AND SEVERAL SPACER SIZES

[75] Inventors: Teruhisa Ishihara, Ishikawa-ken; Shinji Hisamitsu, Hirakata; Hisao Furukawa, Sakai; Hajime Miyake, Kanazawa, all of Japan

[73] Assignee: Matsushita Electric Industrial Co., Ltd., Osaka, Japan

[21] Appl. No.: 437,768

[22] Filed: May 9, 1995

Related U.S. Application Data

[63] Continuation of Ser. No. 18,578, Feb. 17, 1993, abandoned.

[30] Foreign Application Priority Data

Feb. 28, 1992 [JP] Japan ................... 4-043141

[51] Int. Cl.[6] .............................. G02F 1/1339
[52] U.S. Cl. .............................. 359/81; 359/82
[58] Field of Search ................... 359/80, 81, 82, 359/62

[56] References Cited

U.S. PATENT DOCUMENTS

| | | | |
|---|---|---|---|
| 4,050,786 | 9/1977 | Feldman | 359/81 |
| 4,362,771 | 12/1982 | Umada et al. | 359/81 |
| 4,966,442 | 10/1990 | Ono et al. | 359/81 |
| 4,989,955 | 2/1991 | Ito et al. | 359/81 |
| 5,095,378 | 3/1992 | Suzuki | 359/62 |

FOREIGN PATENT DOCUMENTS

| | | | |
|---|---|---|---|
| 3409491 | 9/1985 | Germany . | |
| 55-65928 | 5/1980 | Japan | 359/81 |
| 57-136622 | 8/1982 | Japan . | |
| 58-193518 | 11/1983 | Japan | 359/81 |
| 62-38429 | 2/1987 | Japan . | |
| 62-160423 | 7/1987 | Japan | 359/80 |
| 62-181928 | 11/1987 | Japan . | |
| 63-75729 | 4/1988 | Japan | 359/81 |
| 1267518 | 10/1989 | Japan . | |
| 2168234 | 6/1990 | Japan . | |
| 2181119 | 7/1990 | Japan | 359/80 |
| 2220032 | 9/1990 | Japan . | |
| 3039929 | 2/1991 | Japan . | |
| 3062019 | 3/1991 | Japan . | |
| 359529 | 3/1991 | Japan . | |
| 3239222 | 10/1991 | Japan . | |
| 3230121 | 10/1991 | Japan . | |
| 3293633 | 12/1991 | Japan . | |
| 3288827 | 12/1991 | Japan . | |
| 4031825 | 2/1992 | Japan . | |
| 4030123 | 2/1992 | Japan . | |
| 430123 | 2/1992 | Japan . | |
| 4247430 | 9/1992 | Japan . | |
| 4301815 | 10/1992 | Japan . | |

*Primary Examiner*—Anita Pellman Gross
*Assistant Examiner*—Kenneth Parker
*Attorney, Agent, or Firm*—Lowe, Price, LeBlanc & Becker

[57] ABSTRACT

In an LCD, there are provided plural kinds of spacers, each kind of spacers having different diameters being arranged at a desired portion. Difference in gap between the displaying portion and the peripheral portion can be compensated by the difference of the sizes of the spacers. Such arrangement of spacers are provided by dropping plural fluids, each including a liquid crystal and spacers on either substrate consecutively such that drops of each fluid are regularly arranged at a desired portion. The gap of the peripheral portion can be made larger than that of the middle portion of the displaying portion. At an edge portion of the displaying portion, spacers having intermediate size may be arranged. The gap between the electrodes at an edge portion may be made larger than that of the middle portion of the displaying portion to compensate affection of resistances of wiring from a drive circuit or unevenness of temperature caused by backlighting. Arrangement of spacers can be obtained by using masks and sprinkling spacers also. Drops of fluids may be mixed on the substrate. Two kinds of spacers may be mixed in a fluid.

11 Claims, 7 Drawing Sheets

LIQUID CRYSTAL DISPLAY WITH CURVED SUBSTRATE AND SEVERAL SPACER SIZES

This application is a continuation of application Ser. No. 08/018,578 filed Feb. 17, 1993 now abandoned.

BACKGROUND OF THE INVENTION

1. Field of the Invention

This invention relates to a liquid crystal display apparatus and a method of producing the same.

2. Description of the Prior Art

Liquid crystal display apparatus (LCD) are known and widely in use because the liquid crystal display apparatus are thin and light and requires a low power consumption. The liquid crystal display apparatus comprises two substrates having transparent electrodes, arranged to confront each other with a space in which a liquid crystal is filled.

FIG. 6 is a cross-sectional view of a prior art liquid crystal display apparatus. The prior art liquid crystal display apparatus comprises two substrates 101a and 101b, having transparent electrodes 102a and 102b provided to inner surfaces thereof respectively, arranged to confront each other with a space, a sealing member 104 for supporting sticking, and sealing the substrates 101a and 101b, a liquid crystal 103 filled in the space surrounded by the sealing member 104, and spacers 105 provided between the substrates 101a and 101b. Each of the spacers 105 has a spherical shape for keeping the gap between the substrates 1a and 1b constant. Generally, there is one value of the diameter of the spacer 105. On the other hand, there are another liquid crystal display apparatus having spacers with two different diameters. However, in such a liquid crystal display apparatus, the spaces having two different diameters are uniformly arranged.

FIG. 7A is a plan view of the prior art liquid crystal display apparatus. FIG. 7B is a partial cross-sectional view taken on the line A—A of FIG. 7A. At a displaying portion of the liquid crystal display apparatus (denoted by hatched lines in FIG. 7A), there are the electrodes 102a vertically arranged and the electrodes 102b horizontally arranged. On the other hand, a peripheral portion between the displaying portion and the sealing member 104, there is either of electrodes 102a or 102b. Therefore, as shown in FIG. 7B, a gap between the substrates 101a and 101b at the peripheral portion (substrate gap) is forced to be equal to a gap between the electrodes 102a and 102b (ITO gap) after assembling. This is because the electrode 102a has a thickness and the diameter of the spacer existing at the peripheral portion is the same as the spacer existing at the displaying portion. Accordingly, the substrate 1a is deformed around the edge portion of the display portion, so that the ITO gap at the edge portion of the display portion is smaller than that of the middle portion of the display portion. That is, the interval between the electrodes 102a and 102b at the edge portion of the displaying portion is shorter that at the middle portion of the displaying portion. Thus, there is a problem that uniformly displaying over the displaying portion is difficult in this prior art liquid crystal display apparatus.

Moreover, there is also a problem that at the edge portion of the displaying portion, the uniform displaying is difficult because the resistance from a drive circuit to the electrodes at the edge portion is smaller than that at the middle portion of the displaying portion because a distance from a drive circuit to the electrodes at the edge portion is smaller.

FIG. 8A is a cross-sectional view of a prior art liquid crystal display apparatus with a backlighting source where lamps 10 are provided at both side of a display panel 112 of the liquid crystal display apparatus. FIG. 8B is a plan view of another prior art liquid crystal display apparatus with a backlighting source where the lamps 10 are provided under the display panel 112. In these prior art liquid crystal display apparatus, temperatures of the peripheral areas of the displaying portion is higher than that of the middle portion respectively. Therefore, there is also a problem that at the edged portion of the displaying portion uniform displaying is difficult because of the different in temperature.

SUMMARY OF THE INVENTION

The present invention has been developed in order to remove the above-described drawbacks inherent to the conventional liquid crystal display apparatus.

According to the present invention there is provided a liquid crystal display apparatus comprising: a pair of substrates having electrodes at inner surfaces thereof arranged to confront to each other with a space; a sealing member, formed at a contour outside a displaying portion determined by locations of the pair of electrodes, having a predetermined thickness for supporting, sticking, and sealing the pair of substrates; a plurality of kinds of spacers provided between the pair of substrates and inside the sealing member, each kind of spacers having a different size, each kind of spacers being arranged at a predetermined region inside the sealing member; and a liquid crystal filled in a room defined by the pair of substrates and the sealing member.

According to the present invention there is also provided a method of producing a liquid crystal display apparatus, comprising the steps of: forming a sealing member on either of a pair of substrates at contour of a displaying portion determined by a location of electrodes provided on the pair of substrates; dropping a plurality of fluids, each fluid including a liquid crystal and a different kind of spacers having a predetermined size, each fluid being dropped on a predetermined region of either of the pair of substrates such that drops of the each fluid are substantially regularly arranged; and sticking and sealing the pair of substrates with the sealing member in a reduced atmospheric pressure.

According to the present invention there is further provided a method of producing a liquid crystal display apparatus, comprising the steps of: forming a sealing member on either of a pair of first and second substrates at contour outside a displaying portion determined by locations of electrodes provided on the first and second substrates; dropping a first fluid including a liquid crystal and first spacers having a first size on a predetermined region of the first substrate such that drops of the first liquid crystal are substantially regularly arranged; dropping a second fluid including the liquid crystal and second spacers having a second size on a predetermined region of the second substrate such that drops of the second liquid crystal are substantially regularly arranged; and sticking and sealing the pair of substrates with the sealing member in a reduced atmospheric pressure.

According to the present invention there is further provided a method of producing a liquid crystal display apparatus comprising the steps of: forming a sealing member on either of a pair of substrates at a contour outside a displaying portion determined by locations of electrodes provided on the pair of substrates; dropping a plurality of fluids on either of the pair of substrates subsequently, each fluid including a liquid crystal and one or more kinds of spacers having different sizes such that each of the plurality of fluids is dropped at each predetermined region of either of the pair of substrates and drops of the plurality of fluids are substantially regularly arranged; and sticking and sealing the pair of substrates with the sealing member in a reduced atmospheric pressure.

According to the present invention there is further provided a method of producing a liquid crystal display apparatus comprising the steps of: forming a sealing member on either of a pair of substrates at a contour of a displaying portion determined by locations of electrodes provided on the pair of substrates; sprinkling a plurality kinds of spacers on either of pair of substrates subsequently through a plurality of masks respectively, each of the plurality of masks having an opening to determine the sprinkled each kind of spacers fall at a predetermined region of either of pair of substrates, each of the spacers having a different size; sticking and sealing the pair of substrates with the sealing member with a hole for filling a crystal liquid in a space developed by step of sticking; and filling the liquid crystal in the space though the hole.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described a first embodiment of this invention.

Figure 1A:
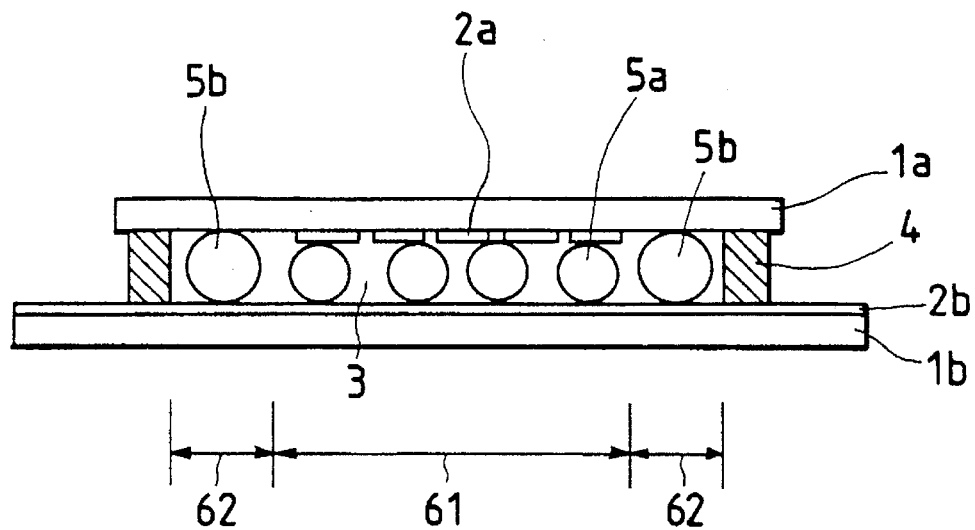
FIG. 1A is a cross-sectional view of a liquid crystal display apparatus of the first embodiment.
Figure 1B:
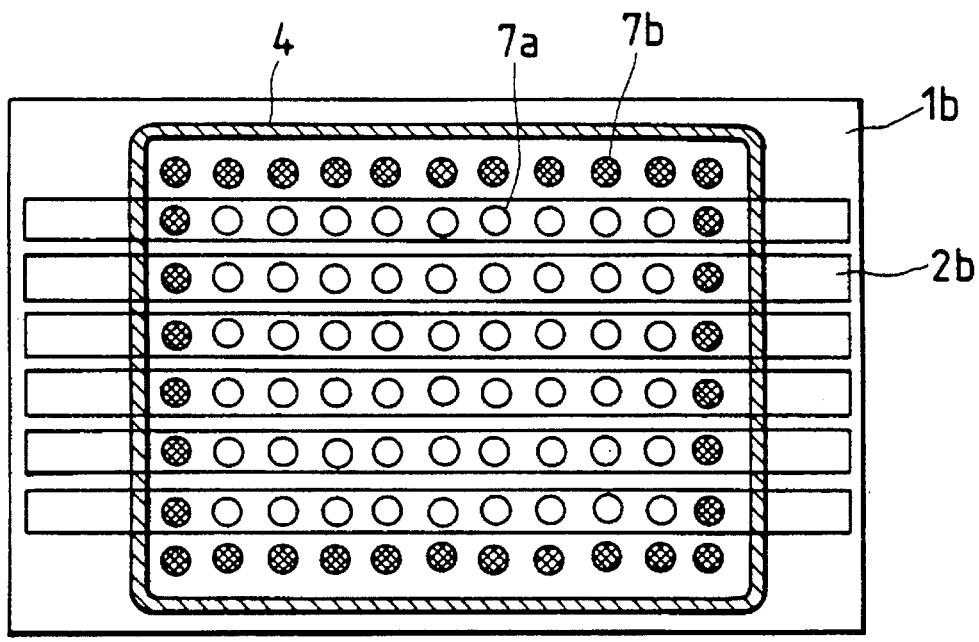
FIG. 1B is a plan view of the liquid crystal display apparatus of the first embodiment.

FIG. 1A is a cross-sectional view of a liquid crystal display (LCD) apparatus of the first embodiment. FIG. 1B is a plan view of the liquid crystal display apparatus of the first embodiment. The liquid crystal display apparatus of the first embodiment comprises two substrates 1a and 1b, for example glass plates, having transparent electrodes 2a and 2b, made of a mixture of indium oxide and tin oxide (ITO) for example, at inner surfaces thereof respectively, arranged to confront each other with a space, a sealing member 4 having a predetermined thickness for supporting, sticking, and sealing the substrates 1a and 1b, spacers 5a and 5b provided between the substrates 1a and 1b, and a liquid crystal 3 filled in the space defined by the substrates 1a and 1b and the sealing member 4. A thickness of the transparent electrodes 2a is 0.2 µm. The spacers 5a have spherical shapes with a diameter of 6.0 µm diameter for keeping the gap between the substrates 1a and 1b, or between the electrodes 2a and 2b, constant. The spacers 5b have spherical shapes with a diameter of 6.2 µm diameter. The spacers 5a are arranged at a displaying portion 61 where both transparent electrodes 2a and 2b are provided to the inner surface of the substrates 1a and 1b respectively. The spacers 5b are arranged at a peripheral portion 62 of the substrate 1a which is outside the displaying portion 61 and inside the sealing member 4. In this liquid crystal display apparatus, the diameters of the spacers 5a and 5b are differentiated to make the gap at the edge and middle portions of the displaying portion 61 even. Therefore, this liquid crystal display apparatus performs displaying uniformly over the whole area of the displaying portion 61.

Hereinbelow will be described a method of producing the liquid crystal display apparatus of this embodiment.

The sealing member 4 is formed on the substrate 1b by the screen process printing or the like as shown in FIG. 1B. Then, a liquid crystal 7a including spacers 5a having 6.0 µm diameter is dropped onto the surface of the substrate 1b such that drops of the liquid crystal 7a are arranged at a regular interval at the displaying portion 61 where both the electrodes 2a and 2b are provided when they are assembled. In FIG. 1B, the liquid crystal 7a is denoted by a circle and one circle schematically represents a condition of a drop of the liquid crystal 7a being landing on the surface of the substrate 1b or electrode 2b. Then, a liquid crystal 7b including spacers 5b having 6.2 µm diameter is dropped onto the surface of the substrate 1b such that drops of the liquid crystal 7b are arranged at a regular interval at the peripheral portion 62 to which only either of the electrodes 2a and 2b is provided. In FIG. 1B, the liquid crystal 7b is denoted by a circle with mesh and similarly, one circle with mesh schematically represents a condition of a drop of the liquid crystal 7b being landing on the surface of the substrate 1b or electrode 2b. Then, both substrates 1a and 1b are stuck together under a reduced pressure, so that the space surrounded by the sealing member 4 is filled with the liquid crystals. Next, the sealing member 4 is hardened. Then, the liquid crystal display apparatus of the first embodiment is obtained.

In the process of dropping the liquid crystals 7a and 7b, the amounts of the liquid crystals 7a and 7b are made as small as possible and the number of locations where a drop of the liquid crystal 7a or 7b should be large. Moreover, the location is controlled accurately. This reduces mixing of the liquid crystal 7a with the liquid crystal 7b when the both substrates 1a and 1b are stuck together.

In this embodiment, there are two kind of spacers 5a and 5b. However, at the corners of the area surrounded by the sealing member 4, dropping of spacers having 6.4 μm at the corners provides a more uniform gap between the electrodes 2a and 2b because there is no electrodes 2a and 2b.

Further, if the thickness of electrodes 2a is different from that of electrodes 2b, the diameters of respective spacers 5a and 5b are selected in accordance with the thickness of electrodes where the spacers are used.

Moreover, in this embodiment, the difference in diameter between the spacer 5a and 5b is equal to the difference in spaces of the gap between the substrates 1a and 1b or thickness of electrodes 2a and 2b. However, the diameter is selected to have a larger value than the difference in accordance with the hardness of the spacers 5a and 5b.

Further, in this embodiment, the difference in the intervals of the gap caused by the thickness of the electrodes 2a and 2b is compensated. However, this method is also effective for eliminate a problem in difference in thickness or space of other structural members, such as a color filter.

Hereinbelow will be described a second embodiment of the liquid crystal display apparatus.

Figure 2A:
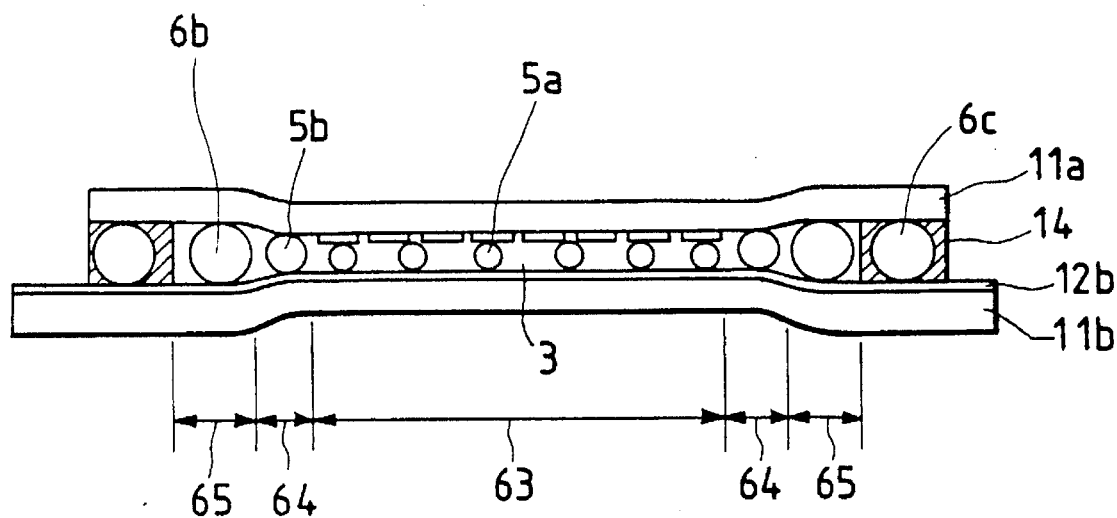
FIG. 2A is a cross-sectional view of a liquid crystal display apparatus of the second embodiment.
Figure 2B:
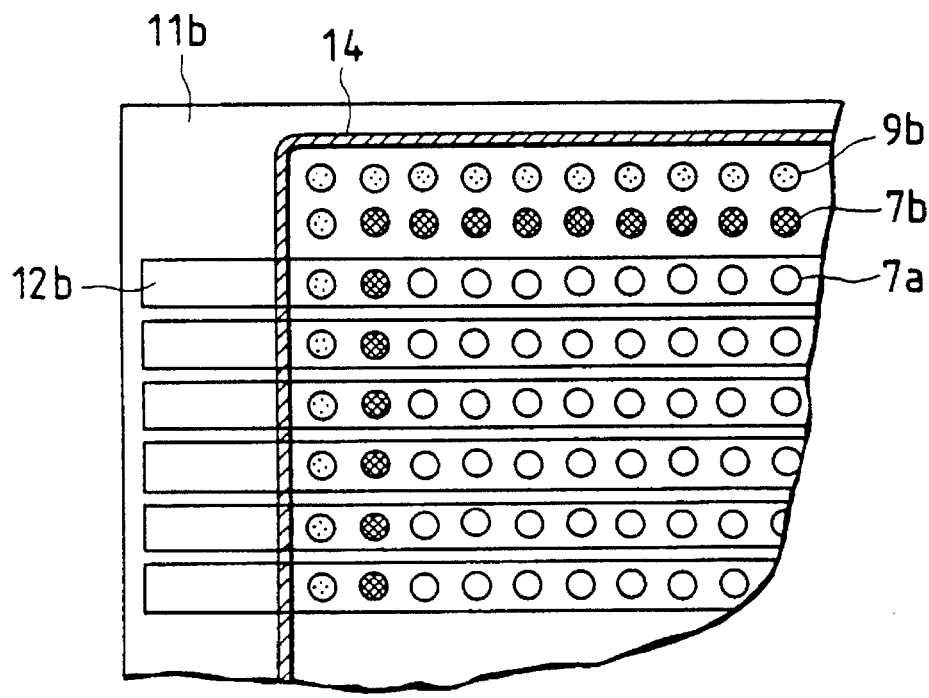
FIG. 2B is a partial plan view of the liquid crystal display apparatus of the second embodiment.

FIG. 2A is a cross-sectional view of a liquid crystal display apparatus of the second embodiment. FIG. 2B is a partial plan view of the liquid crystal display apparatus of the second embodiment. In this embodiment, there is provided a difference in the interval between the substrates to prevent development of bubbles at a low temperature.

The liquid crystal display apparatus of the second embodiment comprises two substrates 11a and 11b, for example glass plates, having transparent electrodes 12a and 12b, made of a mixture of indium oxide and tin oxide for example, at inner surfaces thereof respectively, arranged to confront each other with a space, a sealing member 14 having a predetermined thickness for sealing the space between the substrates 11a and 11b, spacers 5a, 5b, and 6b provided between the substrates 11a and 11b, and a liquid crystal 3 filled in the space defined by the substrates 11a and 11b and the sealing member 14. A thickness of the transparent electrodes 12a is 0.2 μm. The substrates 11a and 11b have a larger gap at its peripheral portion than that at its middle portion to prevent development of bubbles at a low temperature. Each of the spacer 5a has a spherical shape with a diameter of 6.0 μm for keeping the gap between the substrates 11a and 11b, or electrodes 12a and 12b, constant. The spacers 5a are arranged at a displaying portion 63 where both electrodes 12a and 12b are provided. Each of the spacers 5b has a spherical shape with a diameter of 6.2 μm. The spacers 5b are arranged at a peripheral portion 64 of the displaying portion 63. The spacers 6b having a spherical shapes with 6.9 μm are arranged at an immediate inner portion 65 of the sealing member 14. In this liquid crystal display apparatus, the gap between the transparent electrodes 12a and 12b are kept even, so that this liquid crystal display apparatus performs displaying uniformly over the whole area of the displaying portion 63.

The interval between the substrates 11a and 11b at the peripheral portion is larger than that of the middle portion of the displaying portion for preventing the development of bubbles at a low temperature. Spacers 6c are provided in the sealing member 4 and have 7.0 μm diameter.

Hereinbelow will be described a method of producing the liquid crystal display apparatus of this embodiment.

The sealing member 14 is formed on the substrate 11b by the screen process printing or the like as shown in FIG. 2B. Then, a liquid crystal 7a including spacers 5a having 6.0 μm diameter is dropped to the surface of the substrate 11b such that drops of the liquid crystal 7a are arranged at a regular interval at the displaying portion 63 to which both the electrodes 12a and 12b are provided. In FIG. 2B, the liquid crystal 7a is denoted by a circle and one circle schematically represents a condition of a drop of the liquid crystal 7a being landing on the surface of the substrate 11b or electrode 12b. Then, a liquid crystal 7b including spacers 5b having 6.2 μm diameter is dropped onto the surface of the substrate 11b such that drops of the liquid crystal 7b are arranged at a regular interval at the peripheral portion 64 of the displaying portion 63 to which only either of the electrodes 2a and 2b is provided. In FIG. 2B, the liquid crystal 7b is denoted by a circle with mesh and similarly, one circle with mesh schematically represents a condition of a drop of the liquid crystal 7b being landing on the surface of the substrate 1b or electrode 2b. Next, a liquid crystal 9b including spacers 6b having 6.9 μm diameter is dropped onto the surface of the substrate 11b such that drops of the liquid crystal 9b are arranged at a substantially regular interval at the immediate inner portion 65 of the sealing member 14 or outside the peripheral portion 64. Then, both substrates 11a and 11b are stuck together under a reduced atmospheric pressure. This makes the middle of the substrates 11a and 11b hollow because the substrates 11a and 11b are subject to the atmospheric pressure. Next, the sealing member 14 is hardened, so that a liquid crystal display apparatus of this embodiment is obtained.

In the process of dropping the liquid crystals 7a, 7b, and 9b, the amounts of the liquid crystals 7a, 7b, and 9b are made as small as possible and the number of locations where a drop of the liquid crystals 7a, 7b, and 9b felled on should be large. Moreover, the locations where the liquid crystals is dropped are accurately controlled. This reduces mixing of the liquid crystals 7a, 7b, and 9b when the both substrates 11a and 11b are stuck together.

In this embodiment, three kinds of spacers 5a, 5b, and 9b having 6.0 μm, 6.2 μm, and 6.9 μm diameters respectively are selectively arranged at the displaying portion 63, the peripheral portion 64, and immediate inner portion 65 of the sealing member 14 respectively. However, it is also possible that the liquid crystals 7a and 9b are selectively arranged over surface of the substrate 11b. That is, firstly a liquid crystal including the spacers 5a (6.0 μm) and 6b (6.9 μm) in a mixed condition is dropped at the peripheral and immediate inner portions 64 and 65 without use of the spacer 5b (6.2 μm) and then the liquid crystal 7a is arranged at the displaying portion 63. Alternatively, at first, the liquid crystal 7a including the spacer 5a (6.0 μm) is dropped at the displaying portion 63 and the peripheral portion 64. Then, the liquid crystal 9b (6.9) μm) is dropped at the peripheral portion 64 and the immediate inner portion 65 with overlapping. This causes the spacer 5a and 6b to be mixed. This method is convenient because the kind of the spacers is two.

Hereinbelow will be described a third embodiment of the liquid crystal display apparatus.

Figure 3A:
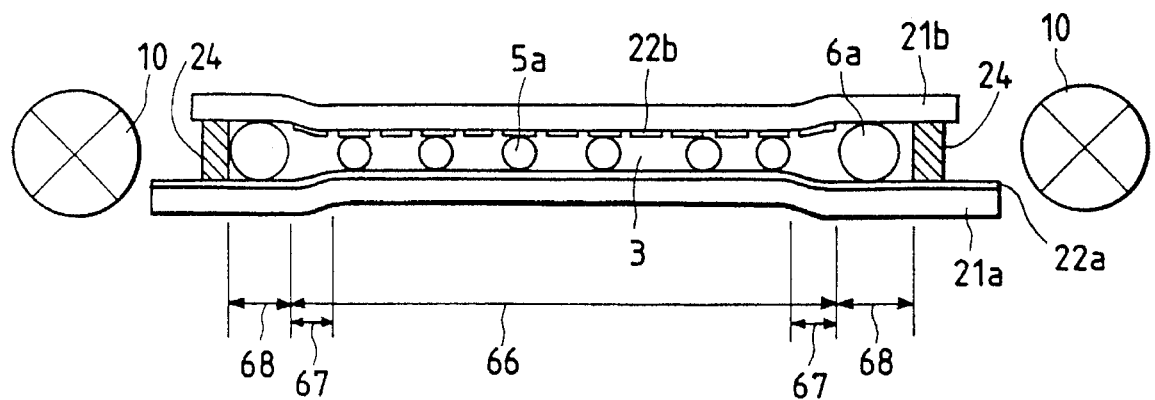
FIG. 3A is a cross-sectional view of a liquid crystal display apparatus with backlighting of the third embodiment.
Figure 3B:
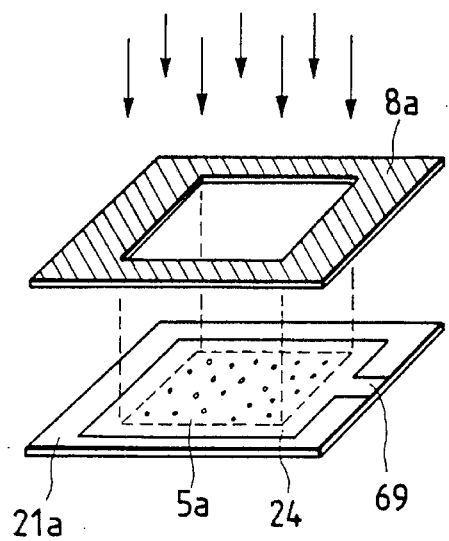
FIGS. 3B and 3C are perspective views of the third embodiment for showing processing of producing the liquid crystal display apparatus.
Figure 3C:
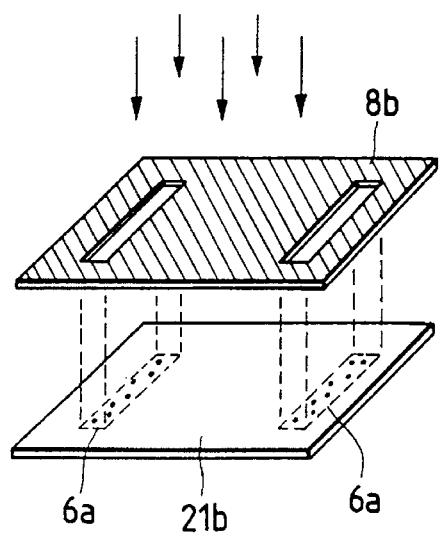

FIG. 3A is a cross-sectional view of a liquid crystal display apparatus with backlighting of the third embodiment. FIGS. 3B and 3C are perspective views of the third embodiment for showing processing of producing the liquid crystal display apparatus. In this embodiment, a gap between the substrates 21a and 21b at an edge portion 67 of a displaying portion 66 of the liquid crystal display apparatus is increased gradually to prevent development of uneven displaying at the edge portion 67, which caused by change of threshold voltages of displaying due to increase in the temperature at the edge portion by lamps 10 for the backlighting.

The liquid crystal display apparatus of the third embodiment comprises two substrates 21a and 21b, for example glass plates, having transparent electrodes 22a and 22b, made of a mixture of indium oxide and tin oxide for example, at inner surfaces thereof respectively, arranged to confront each other with a space, a sealing member 24 for supporting sticking, and sealing the substrates 21a and 21b, a liquid crystal 3 filled in the space surrounded by a sealing member 24, and spacers 6a and 5a between the substrates 21a and 21b. Lamps 10 for backlighting the displaying portion 66 are provided outside of the liquid crystal display. A thickness of the transparent electrodes 22a is 0.2 μm. The substrates 21a and 21b have a larger gap at its peripheral portion 68 than that at the middle portion of the displaying portion 66 such that the gap is gradually increased at an edge portion 67 of displaying portion 66. Each of the spacers 5a has a spherical shape with a diameter of 6.0 μm diameter for keeping the gap between the substrates 21a and 21b constant. The spacers 5a are arranged at the displaying portion 66 where both electrodes 12a and 12b are provided. Each of the spacers 6a has a spherical shape with a diameter of 6.5 μm diameter. The spacers 6a are arranged at a peripheral portion 68 of the displaying portion 66. In this liquid crystal display apparatus, the difference in the diameters of the spacers 5a and 6a is larger than the difference in total thickness of the electrodes 22a and 22b, so that interval between the electrodes 22a and 22b at the edge portion 67 of the displaying portion 66 is larger than that at the middle portion of the displaying portion 66. Therefore, this liquid crystal display apparatus performs displaying uniformly between the middle and edge portions of the displaying portion though the temperature of the edge portion is higher than that of the middle portion due to heat from the lamps 10.

Hereinbelow will be described a method of producing the liquid crystal display apparatus of this embodiment.

The sealing member 24 is formed on the substrate 11b by the screen process printing or the like. Then, a mask 8a is masked on the substrate 21a and the spacers 5a (6.0 μm) are sprinkled to be laid on the substrate 21a as shown in FIG. 3B. That is, the spacers 5a (6.0 μm) are arranged over the displaying portion 66. Similarly, a mask 8b is placed on the substrate 21b and the spacers 6a (6.5 μm) are sprinkled to laid on the substrate 21b as shown in FIG. 3C. That is, the spacers 5a (6.5 μm) are arranged at the peripheral portion 68 at both sides of the display portion 66. The upper and lower portions (In FIG. 3C) of the peripheral portion 68 may be sprinkled with the spacers 6a also. Then, both substrates 21a and 21b are stuck together. Next, the sealing member 24 is hardened. Then, a liquid crystal 3 is filled in the gap surrounded by the sealing member 24 through a hole 69 by the vacuum injection method, so that the liquid crystal display apparatus of this embodiment as shown in FIG. 3A is obtained.

In this embodiment, only two kinds of spacers 5a (6.0 μ) and 6a (6.5 μm) are used for the gap between the electrodes 22a and 22b. If spacers having an intermediate diameter between the spacers 5a and 6a are arranged at the edge portion 67, the gap can be controlled more accurately. However, if a large number of spacers are used, the number of masks increases and processing of spraying the spacers requires much labor and time, so that the efficiency of producing the liquid crystal display apparatus will decrease. However, if the method mentioned in the first embodiment, that is, the liquid crystal including two kinds of spacers is selectively dropped at the edge portion, is applied to such a case, the labor and time for processing are saved.

Moreover, the method of producing the liquid crystal display of this embodiment can be applied to the first and second embodiment to selectively arrange the spacers at a desired areas with in the sealing member. In contrast, the methods of producing the liquid crystal display of the first and second embodiments are applicable to this embodiment. That is, a liquid crystal including the spacers 6a is dropped to the peripheral portion 68 and a liquid crystal including the spacers 5a is dropped to the middle portion of the displaying portion 66.

Hereinbelow will be described a fourth embodiment of the liquid crystal display apparatus. In a color liquid crystal display apparatus, bright lamps are required for backlighting. Thus, the affect of difference in temperature between the middle portion and the peripheral portion of the display portion is larger than the case of the third embodiment, so that generally thresh-hold voltages of respective pixels, which determine black and white conditions, are not uniform. In this embodiment, the thresh-hold voltages where the thresh-hold voltages are low are increased by changing the gap there in accordance with degree of decrease in the thresh-hold voltage.

Figure 4A:
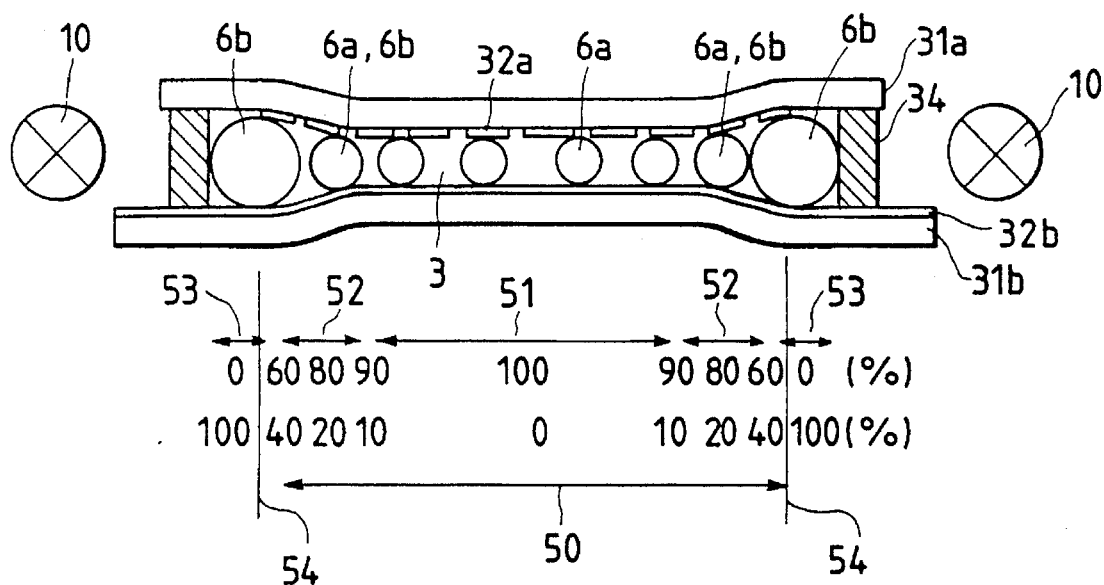
FIG. 4A is a cross-sectional view of a liquid crystal display apparatus with back lighting of the fourth embodiment.

FIG. 4A is a cross-sectional view of a liquid crystal display apparatus with back lighting of the fourth embodiment. In this embodiment, a gap between the electrodes 32a and 32b at an edge portion 52 of a displaying portion 50 of the liquid crystal display apparatus is increased gradually to prevent development of unevenness in displaying at the edge portion, which caused by increase in the temperature at the edge portion by lamps 10 for the backlighting. In the third embodiment, the gap at the edge portion 52 was controlled also. However, in this embodiment, the gap at the edge portion 52 is more precisely.

The liquid crystal display apparatus of the fourth embodiment comprises two substrates 31a and 31b, for example glass plates, having transparent electrodes 32a and 32b, made of a mixture of indium oxide and tin oxide (ITO) for example, at inner surfaces thereof respectively, arranged to confront each other with a space, a sealing member 34 for supporting, sticking, and sealing the substrates 31a and 31b, a liquid crystal 3 filled in the space surrounded by a sealing member 34, and spacers 6a and 6b provided between the substrates 31a and 31b. Lamps 10 for backlighting the displaying portion 50 are provided outside the substrates 31a and 31b. A thickness of the transparent electrode 32a or 32b is 0.2 μm. The substrates 31a and 31b have a larger gap at its peripheral portion 53 than that at its middle portion 51 and such that the gap is gradually increased at the edge portion 52 of displaying portion 50. Each of the spacers has a spherical shape with a diameter of 6.5 μm for keeping the gap between the substrates 1a and 1b a desired value. The spacers 6a are arranged at a middle portion of the displaying portion 50. Each of the spacers 6a has a spherical shape with a diameter of 6.5 μm diameter. The spacers 6a are arranged at a middle portion 51 of the displaying portion 50. The spacers 6b are arranged at a peripheral portion 53 of the displaying portion 50. In this liquid crystal display apparatus, the difference in the diameters of the spacers 6a and 6b is larger than the total thickness of the electrodes 32a and 32b. This controls the thresh-hold voltages. At the edge portion 52 of displaying portion 50, the spacers 6a and 6b are mixed and the ratio of the numbers per unit area between these spacers 6a and 6b are varied with distance from the edge 54 of the displaying portion 50. Generally, the gap between the substrates 31a and 31b are smaller than the diameter of the spacers in fact. That is, the spacers 6a and 6b are subjected to the pressure from the electrodes 31a and 31b, so that the spacers 31a and 31b are slightly contracted. Therefore, the gaps between the substrates 31a and 31b are adjustably controlled by changing the ratio between the number of the spacers 6a per the unit area and the number of the spacers 6b per the unit area.

Figure 4B:
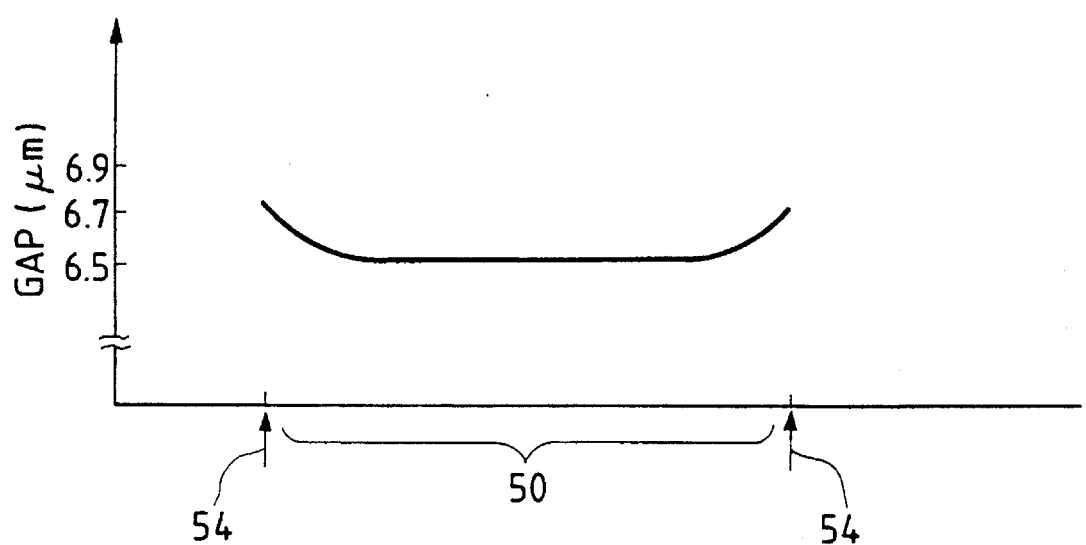
FIG. 4B shows a curve showing the relation between the space of the gap of the substrates of the fourth embodiment.

In this embodiment, the deformation amount of the diameter of the spacer 6b having a larger diameter is larger, so that the deformation amount of the diameter of the spacer 6a having a smaller diameter is small. Therefore, it is considered that the gap is determined by the ratio between the number of the spacers 6a and the spacers 6a per unit area. FIG. 4B shows a curve showing the relation between the space of the gap of the substrates 31a and 31b with respective to location within the displaying portion 50. As shown in FIG. 4B, the curve of the gap shows that the substrates 31a and 31b have a tapered form at the edge potion 54. Therefore, when the liquid crystal display apparatus is used with backlighting, an uniform displaying is obtained. That is, unevenness of temperature caused by backlighting by the lamps 10 can be compensated.

Figure 5A:
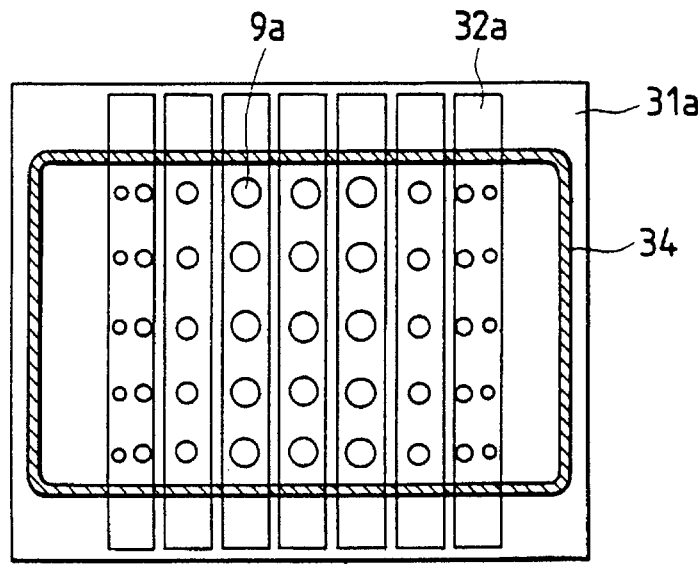
FIG. 5A is a plan view of a substrate for showing the processing of producing the liquid crystal display apparatus of the fourth embodiment.
Figure 5B:
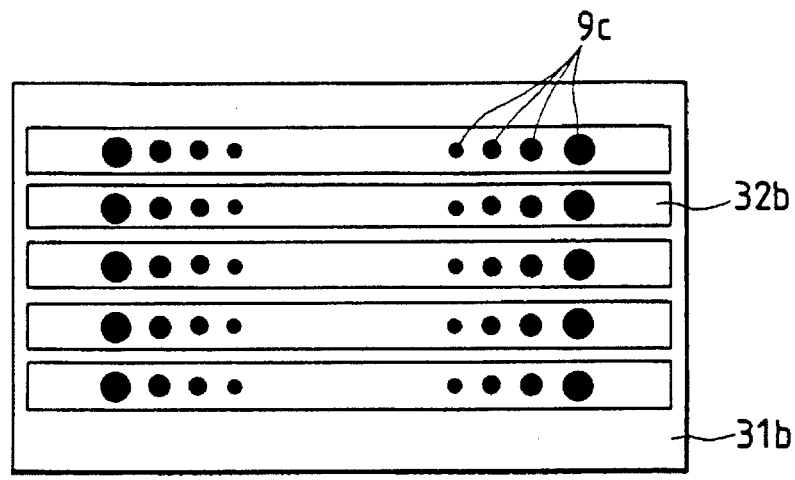
FIG. 5B is a plan view of a substrate with electrode 32b for showing the processing of producing the liquid crystal display apparatus of the fourth embodiment.
Figure 6:
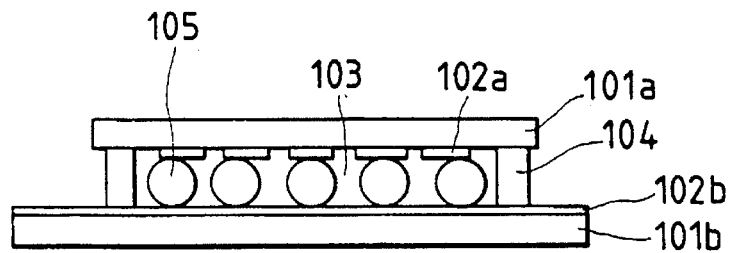
FIG. 6 is a cross-sectional view of a prior art liquid crystal display apparatus.
Figure 7A:
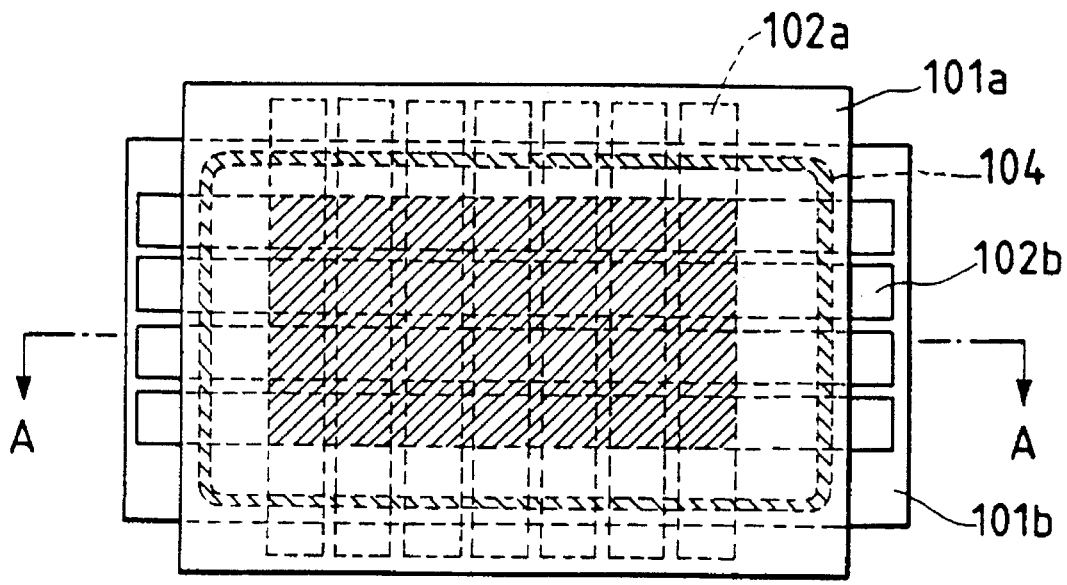
FIG. 7A is a plan view of a prior art liquid crystal display apparatus.
Figure 7B:
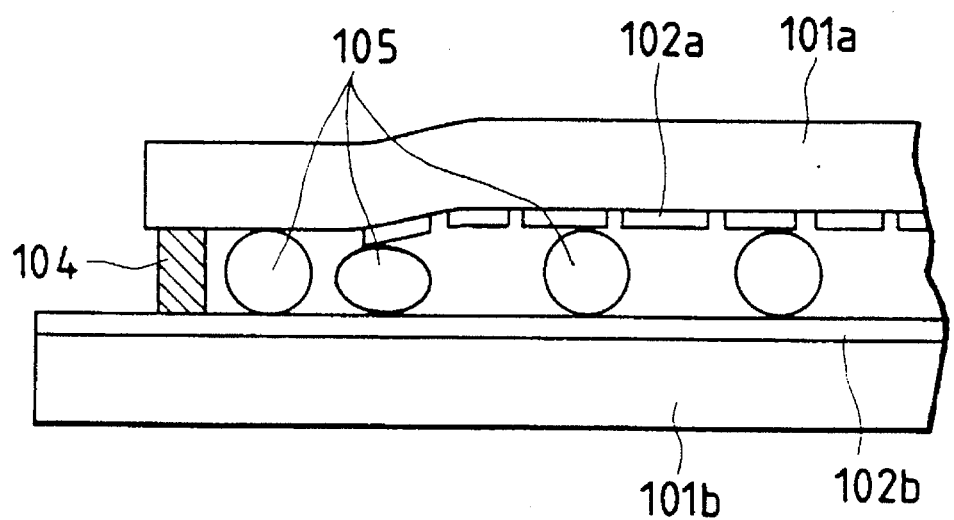
FIG. 7B is a partial cross-sectional view taken on the line A—A of FIG. 7A.
Figure 8A:
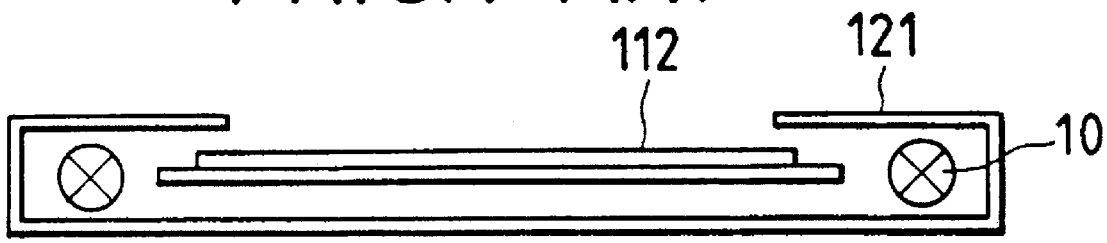
FIG. 8A is a cross-sectional view of a prior art liquid crystal display apparatus with a backlighting source.
Figure 8B:
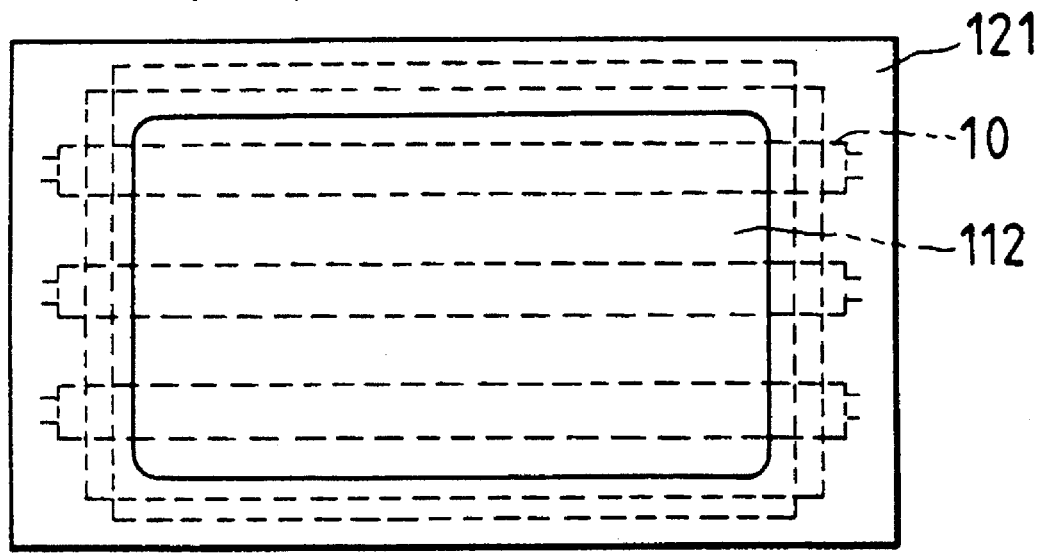
FIG. 8B is a plan view of another prior art liquid crystal display apparatus with a backlighting source.

Hereinbelow will be described a method of producing the liquid crystal display apparatus of this embodiment. FIG. 5A is a plan view of the substrate 31a with electrode 32a for showing the processing of producing the liquid crystal display apparatus of the fourth embodiment. FIG. 5B is a plan view of the substrate 31b with electrode 32b for showing the processing of producing the liquid crystal display apparatus of the fourth embodiment.

The sealing member 34 is formed by the screen process printing or the like on the substrate 31a where the orientation processing is performed. Then, as shown in FIG. 5A, a liquid crystal 9a denoted with a circle including spacers 6a having 6.5 μm diameter is dropped onto the substrate 31a or the electrodes 32a with variation of the amount of a drop of the liquid crystal 9a at the displaying portion 50. The sizes of the circles shown in FIG. 5A represent the amount of the drops of the liquid crystal 9a schematically. That is, the amount of a drop of the liquid crystal 9a at the edge portion 52 is smaller than that at the middle of the displaying portion 50. On the other hand, on the substrate 31b where the orientation processing has been performed, a liquid crystal 9c, denoted with a dot, including spacers 6b having 6.9 μm diameter is consecutively dropped onto the substrate 31b or the electrodes 32b with variation of the amount of a drop of the liquid crystal 9a at the edge portion 52 of displaying portion 50. That is, the amount of the drops of the liquid crystal 9c at the peripheral portion is large and that is decreased with the distance from the peripheral portion 53. The sizes of the circles with mesh shown in FIG. 5B represent the amount of the drops of the liquid crystal 9c. That is, the amount of a drop of the liquid crystal 9a at the edge portion 52 is smaller than that at the peripheral portion 53 of the displaying portion 50. Then, the substrates 31a and 31b are stuck together in a reduced atmospheric pressure, so that the liquid crystal 9a and 9c are mixed with each other at the edge portion 52 and the gap of the substrates 31a and 31b are filled with the liquid crystals 9a and 9c. Moreover, this makes the middle of the substrates 31a and 31b hollow because the substrates 31a and 31b are subject to the atmospheric pressure. Then, the sealing member 34 is hardened.

In the liquid crystal display apparatus produced as mentioned above, the spacers 6a are arranged at the middle portion 51 of the displaying portion 50 and the spacers 6b are arranged at the peripheral portion 53 of the displaying portion 50. At the intermediate portion between the middle portion 51 of the displaying portion 50 and the peripheral portion 53, i.e., the edge portion 52 of the displaying portion 50, the spacers 9a and 9c are arranged with the mixed condition. The gap is varied with the ratio of the number of the spacers 9a and 9c per the unit area. The ratio of the number of the spacers 6a and 6b are shown in percent in FIG. 4A.

In the above mentioned embodiment, the liquid crystals 9a and 9c are dropped onto the substrates 31a and 31b respectively. However, it is possible to drop the liquid crystals 9a and 9c onto either of the substrates 31a or 31b. Moreover, in this embodiment, the number of kinds of spacers is two. However, the number of kind of the spacers is not limited to two. In addition, in this embodiment, density of the spacers arranged on the substrates is controlled and the more than one kind of the spacers are selectively arranged. In contrast with this, it is very difficult to control the density of the spacers and to selectively arrange more than one kind of spacers on the substrates.

Moreover, in this embodiment, the affection of the backlighting is compensated by the variation of the space of the gap between the substrates 31a and 32b. However, the decrease of the drive voltage in the electrodes 32a and 32b at the edge portion 52 of the displaying portion 50 can be compensated by the same method.

Further, the method of producing the liquid crystal display of the second embodiment is applicable to this embodiment. That is, these masks having holes corresponding to the middle portion 51, the displaying portion 52, and the edge and peripheral portions 52 and 53 provides the arrangement of the spacers of third embodiment.

In the liquid crystal display, there are orientation layers are provided on the substrates 1a, 1b, 11a, 11b, 21a, 21b, 31a, and 31b and the electrodes 2a, 2b, 12a, 12b, 22a, 22b, 32a, and 32b. However, thickness of the orientation layers is constant. Thus, the orientation layers are omitted for convenience for description throughout the specification.

What is claimed is:

1. A liquid crystal display apparatus comprising:

(a) a pair of substantially flat substrates having continuous opposed parallel surfaces and electrodes at inner surfaces of said substrates, said substrates being arranged to confront each other in a spaced apart relationship, said substrates having a bend which provides a wider spacing between the pair of substrates around a periphery of the liquid crystal apparatus;

(b) a sealing member, formed at a contour outside a displaying portion determined by locations of said pair of electrodes, said sealing member having a predetermined thickness for supporting, sticking, and sealing said pair of substrates;

(c) a plurality of kinds of spacers provided between said pair of substrates and inside said sealing member, each kind of spacers having a different size, each kind of spacers being arranged at a predetermined region inside said sealing member, wherein said spacers having different sizes are arranged at predetermined regions inside said sealing member to form an area between said pair of substrates at a peripheral portion inside said sealing member whereat said substrates are more spaced apart than at others areas, with larger spacers provided in a peripheral region within an inner boundary of the sealing member so as to compensate for the wider spacing between the pair substrates due to the bend; and (d) a liquid crystal filled in a space defined by said pair of substrates and said sealing member.

2. A liquid crystal display apparatus as claimed in claim 1, wherein said plurality of kinds of spacers includes first and second kinds of spacers, said first kind of spacers are arranged at said displaying portion, and said second kind of spacers are arranged at a peripheral portion between said displaying portion and said sealing member.

3. A liquid crystal display apparatus as claimed in claim 2, wherein a difference in size of said first and second spacers is larger than a total thickness of said electrodes of said pair of said substrates.

4. A liquid crystal display apparatus as claimed in claim 1, wherein said plurality of kinds of spacers includes first and second spacers, said first spacers are arranged at a first region within said sealing member, and said second spacers are arranged at a second region within said sealing member, said first region overlapping said second region to mix said first and second kinds of spacers.

5. A liquid crystal display apparatus as claimed in claim 1, wherein said plurality of kinds of spacers includes first, second and third spacers, said first spacers are arranged at an edge portion of said display portion, said second spacers are arranged at said display portion inside said edge portion, and said third spacers are arranged at a peripheral portion between said edge portion and said sealing member, wherein said first spacers have an intermediate size between said second and third spacers, and a difference between cross sectional diameters of said third and second spacers is greater that a thickness of said electrodes.

6. A liquid crystal display apparatus comprising:

(a) a pair of substrates having a pair of electrodes at inner surfaces thereof arranged to confront each other in a spaced apart relationship, said substrates having a bend which provides a wider spacing between the pair of substrates around a periphery of the liquid crystal apparatus;

(b) a sealing member, formed at a contour outside a displaying portion determined by locations of said pair of electrodes, said sealing member having a predetermined thickness for supporting, sticking, and sealing said pair of substrates;

(c) a plurality of kinds of spacers provided between said pair of substrates and inside said sealing member, each kind of spacer having a different size, wherein said spacers having different sizes are arranged at predetermined regions inside said sealing member to form a first area between said pair of substrates whereat said substrates are spaced apart a different amount than at a second area between said pair of substrates, said first area being a middle portion of said pair of substrates and said second area being a peripheral portion of said substrate and said pair of substrates being spaced closer together at said first area than at said second area, with larger spacers are provided in a peripheral region within an inner boundary of the sealing member so as to compensate for the wider spacing between the pair of substrates due to the bend; and (d) a liquid crystal filled in a space defined by said pair of substrates and said sealing member.

7. A liquid crystal display apparatus as claimed in claim 6, wherein said plurality of kinds of spacers includes first and second kinds of spacers, said first kind of spacers are arranged at said displaying portion, and said second kind of spacers are arranged at a peripheral portion between said displaying portion and said sealing member.

8. A liquid crystal display apparatus as claimed in claim 7, wherein a difference in size of said first and second kind of spacers is larger than a total thickness of said electrodes of said pair of electrodes.

9. A liquid crystal display apparatus as claimed in claim 6, wherein said plurality of kinds of spacers includes first and second kinds of spacers, said first kind of spacers are arranged at said displaying portion, and said second kind of spacers are arranged at a peripheral portion of said displaying portion.

10. A liquid crystal display apparatus as claimed in claim 6, wherein said plurality of kinds of spacers includes first and second spacers, said first spacers are arranged at a first region within said sealing member, and said second spacers are arranged at a second region within said sealing member, said first region overlapping said second region to mix said first and second kinds of spacers.

11. A liquid crystal display apparatus as claimed in claim 6, wherein said plurality of kinds of spacers includes first, second and third spacers, said first spacers are arranged at an edge portion of said display portion, said second spacers are arranged at said display portion inside said edge portion, and said third spacers are arranged at a peripheral portion between said edge portion and said sealing member, wherein said first spacers have an intermediate size between said second and third spacers, and a difference between cross sectional diameters of said third and second spacers is greater that a thickness of said electrodes.

* * * * *